(12) United States Patent
Kim

(10) Patent No.: US 8,169,568 B2
(45) Date of Patent: May 1, 2012

(54) LIQUID CRYSTAL DISPLAY DEVICE

(75) Inventor: Min-Woo Kim, Suwon-si (KR)

(73) Assignee: Samsung Mobile Display Co., Ltd., Giheung-Gu, Yongin, Gyunggi-Do (KR)

( * ) Notice: Subject to any disclaimer, the term of this patent is extended or adjusted under 35 U.S.C. 154(b) by 534 days.

(21) Appl. No.: 12/379,776

(22) Filed: Feb. 27, 2009

(65) Prior Publication Data

US 2009/0219469 A1 Sep. 3, 2009

(30) Foreign Application Priority Data

Feb. 28, 2008 (KR) .................. 10-2008-0018315

(51) Int. Cl.
*G02F 1/1335* (2006.01)

(52) U.S. Cl. ........ 349/106; 349/107; 349/108; 349/114; 349/73; 349/74; 349/77; 349/78

(58) Field of Classification Search .............. 349/56, 349/74, 73, 77, 78, 106, 107, 108, 114
See application file for complete search history.

(56) References Cited

U.S. PATENT DOCUMENTS

| | | | | |
|---|---|---|---|---|
| 6,864,130 | B2 * | 3/2005 | Koo et al. | 438/166 |
| 7,605,885 | B2 * | 10/2009 | Ina et al. | 349/106 |
| 7,924,387 | B2 * | 4/2011 | Hung | 349/144 |
| 2002/0171791 | A1 * | 11/2002 | Anno et al. | 349/113 |
| 2004/0021807 | A1 * | 2/2004 | Narutaki et al. | 349/106 |
| 2006/0097972 | A1 * | 5/2006 | Takeuchi et al. | 345/90 |
| 2007/0216619 | A1 * | 9/2007 | Hung | 345/87 |
| 2007/0216840 | A1 * | 9/2007 | Liao et al. | 349/141 |

FOREIGN PATENT DOCUMENTS

| | | |
|---|---|---|
| JP | 2001-036087 A | 2/2001 |
| JP | 2001-117115 A | 4/2001 |
| JP | 2005-266814 A | 9/2005 |
| KR | 10-2002-0015097 | 2/2002 |
| KR | 10-2002-0068765 | 8/2002 |
| KR | 10-2004-0062376 | 7/2004 |
| KR | 10-2007-0028554 | 3/2007 |

OTHER PUBLICATIONS

"Notice of Allowance" issued by Korean Patent Office on Apr. 1, 2009 for Applicant's corresponding Korean Patent Application No. 2008-0018315.

* cited by examiner

*Primary Examiner* — Edward Glick
*Assistant Examiner* — Sang Nguyen
(74) *Attorney, Agent, or Firm* — Robert E. Bushnell, Esq.

(57) ABSTRACT

A liquid crystal display device has a first substrate, a second substrate facing the first substrate, and a liquid crystal layer disposed between the first and the second substrates. The first substrate includes a plurality of pixels, each of which includes a thin film transistor and a pixel electrode. The second substrate includes a color filter facing a pixel electrode of one of the pixels, and a black matrix formed on a region except the color filter. The black matrix has an opening that exposes a portion of one of the gate electrodes. External light entering the opening is reflected from the gate electrode.

18 Claims, 5 Drawing Sheets

LIQUID CRYSTAL DISPLAY DEVICE

CLAIM OF PRIORITY

This application makes reference to, incorporates the same herein, and claims all benefits accruing under 35 U.S.C. §119 from an application for LIQUID CRYSTAL DISPLAY DEVICE earlier filed in the Korean Intellectual Property Office on the 28 of Feb. 2008 and there duly assigned Serial No. 10-2008-0018315.

BACKGROUND OF THE INVENTION

1. Field of the Invention

The present invention relates to a liquid crystal display device, and particularly a micro reflective-type liquid crystal display device to overcome an aperture ratio decrease in a liquid crystal display device in a dual gate scheme.

2. Discussion of the Related Art

Recently, as an information-oriented society rapidly progresses, there has been a need for flat panel displays having excellent characteristics such as thinness, light weight, low power consumption, etc. Particularly, a liquid crystal display device among the flat panel displays is excellent in resolution, color display, picture quality, etc. and thus it is actively applied to a notebook or a desktop monitor.

In general, the liquid crystal display is formed in a structure that two substrates each formed with electric field generating electrodes are disposed so that surfaces formed with the two electrodes face each other, and liquid crystal material is injected between the two substrates. Such a liquid crystal display device is a device, in which liquid crystal molecules are reoriented by electric field generated by applying voltage to the two electrodes, and a device that displays an image by changing light transmission according to the orientation of the liquid crystal molecules. That is, the liquid crystal display displays an image by adjusting the light transmission through a liquid crystal layer by adjusting electric field applied to the liquid crystal layer.

Recently, as the liquid crystal display device demonstrates higher picture quality and/or larger size, the number of the data IC chips tends to increase. However, the increase in the number of the data IC chips becomes a disadvantage in terms of cost reduction. Also, the number of output channels varies depending on a chip selected according to the resolution of the liquid crystal panel, since the data IC chips having predetermined channels capable of being coupled to the data line are different by the resolution of the liquid crystal panel. Accordingly, the data IC chips of different numbers having different output channels by the resolution of the liquid crystal panel are used, so that work ability is lowered and manufacturing cost increases.

In order to overcome these problems, a study on a dual gate scheme constantly fixing the number of the data IC chips to be small and increasing the number of gate IC chips capable of implementing at a low cost, as compared to the data IC chip has progressed.

SUMMARY OF THE INVENTION

Accordingly, the present invention is proposed to overcome an aperture ratio deterioration problem generated in a dual gate-scheme liquid crystal display device. It is an object of the present invention to provide a liquid crystal display device capable of improving outdoor visibility by opening a portion of a black matrix region formed on an upper substrate corresponding to gate lines to micro-reflect external light through the exposed gate line.

In order to accomplish the above object, there is provided a liquid crystal display device, including a first substrate, a second substrate facing the first substrate, and a liquid crystal layer disposed between the first substrate and the second substrate. The first substrate comprises a plurality of data electrodes, a plurality of gate electrodes arranged to intersect the data electrodes, and a plurality of pixels. Each of the pixels includes a thin film transistor and a pixel electrode. Each of the pixels is coupled to one of the data lines and one of the gate lines. The second substrate comprises a plurality of color filters and a black matrix formed on a region in which the color filters are not formed. Each of the color filters faces one of the pixel electrodes, and the black matrix has openings that expose the gate electrodes.

One of the pixels disposed by one side of a first one of the data electrodes may be coupled to a first one of the gate electrodes, and another of the pixels disposed by an opposite side of the first one of the data electrodes may be coupled to a second one of the gate electrodes. Both of the one of the pixels and the another of the pixels may be coupled to the first one of the data electrodes.

Both of the one of the pixels and the another of the pixels may be disposed between the first one of the gate electrodes and the second one of the gate electrodes. One of the openings may be formed on the second one of the gate electrodes. The one of the openings may be formed between the first one of the data electrodes and a second one of the data electrodes located by the one side of the first one of the data electrodes. Another of the openings may be formed on the first one of the gate electrodes. The another of the openings may be formed between the first one of the data electrodes and a third one of the data electrodes located by the opposite side of the first one of the data electrodes. No opening may be formed on a portion of the first one of the gate electrodes located between the first one of the data electrodes and the second one of the data electrodes, and no opening may be formed on a portion of the second one of the gate electrodes located between the first one of the data electrodes and the third one of the data electrodes.

Each of the openings may expose a portion of one of the gate electrodes located between two of the data electrodes.

Each of the color filters may be arranged between two of the openings. The two of the openings may be aligned in a direction substantially parallel to one of the data electrodes. At least two of the color filters may be arranged between nearest two of the openings. The nearest two of the openings may be aligned in a direction substantially parallel to one of the data electrodes.

At least two of the pixels may be disposed between two of the data electrodes. One of the at least two of the pixels may be coupled to a first one of the gate electrodes, and another of the at least two of the pixels may be coupled to a second one of the gate electrodes. The one of the at least two of the pixels and the another of the at least two of the pixels may be both formed between the first one of the gate electrodes and the second one of the gate electrodes. One of the openings may be formed on the second one of the gate electrodes at a location closer to the one of the at least two of the pixels than the another of the at least two of the pixels, and another of the openings may be formed on the first one of the gate electrodes at a location closer to the another of the at least two of the pixels than the one of the at least two of the pixels.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicated the same or similar components, wherein.

DETAILED DESCRIPTION OF THE INVENTION

Figure 1:
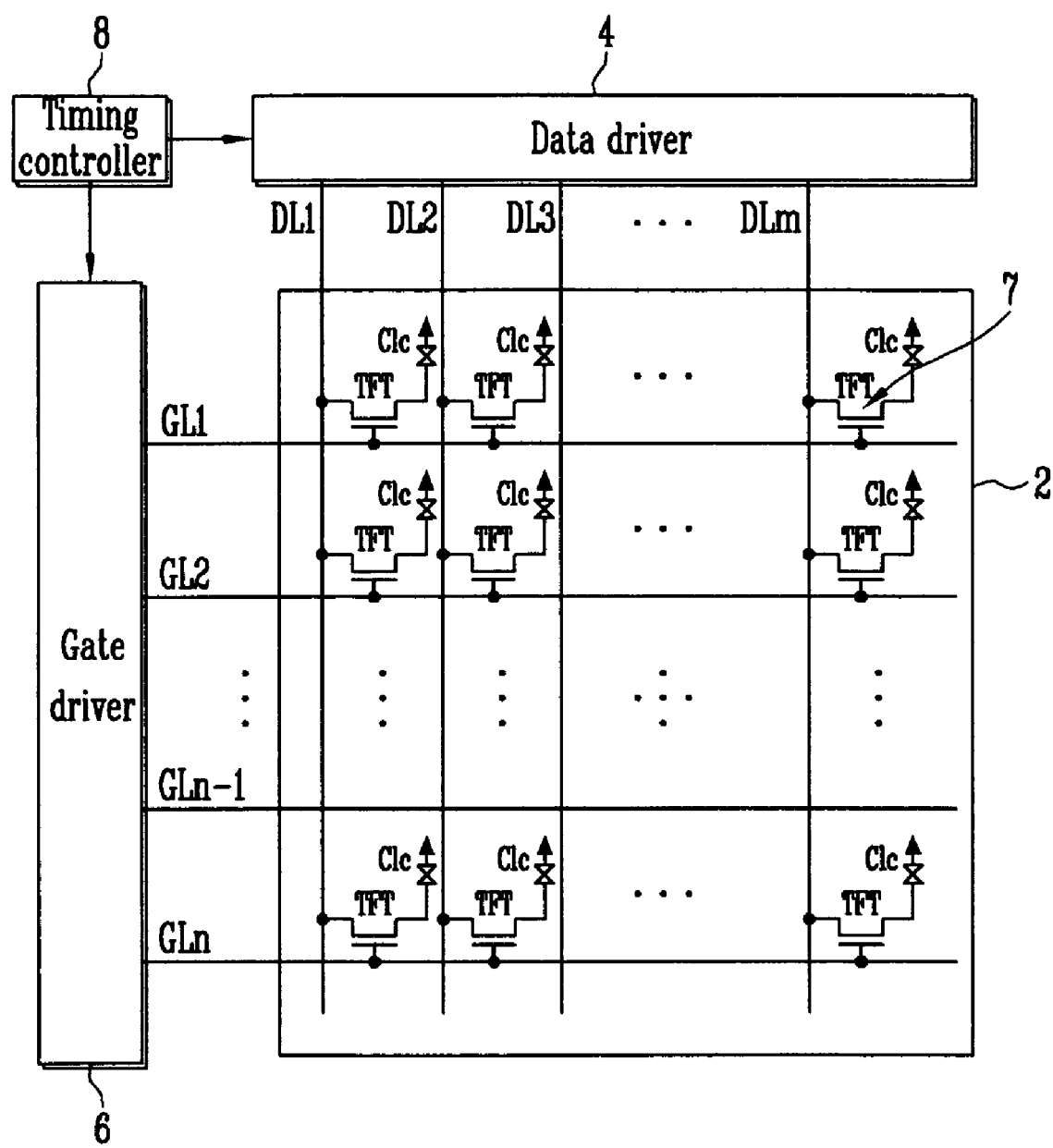
FIG. 1 is a schematic block diagram showing a liquid crystal display device.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on another element or be indirectly on another element with one or more intervening elements interposed therebetween. Also, when an element is referred to as being "connected to" another element, it can be directly connected to another element or be indirectly connected to another element with one or more intervening elements interposed therebetween. When a first element is described as being coupled to a second element, the first element may be not only directly coupled to the second element but may also be indirectly coupled to the second element via a third element. Hereinafter, like reference numerals refer to like elements.

Hereinafter, an embodiment of the present invention will be described in detail with reference to accompanying drawings.

FIG. 1 is a schematic block diagram showing a liquid crystal display device. Referring to FIG. 1, the liquid crystal display device includes a liquid crystal panel 2, a timing controller 8, a gate driver 6, and a data driver 4.

The liquid crystal panel 2 includes thin film transistors TFT formed at intersection portions of gate lines GL1 to GLn and data lines DL1 to DLm, and liquid crystal cells coupled to the thin film transistors TFT.

In the case where a scan signal (for example, a gate high voltage VGH) is supplied from the gate line GL, the thin film transistor TFT is turned on to supply a pixel signal from the data line DL to the liquid crystal cell 7. In the case that the scan signal is not applied from the gate line GL, the thin film transistor TFT is turned off so that a charged pixel signal is maintained in the liquid crystal cell 7.

The liquid crystal cell 7 is equivalently represented by a liquid crystal capacitance capacitor Clc, and includes a common electrode and a pixel electrode coupled to the thin film transistor TFT. The common electrode and the pixel electrode face each other with liquid crystal therebetween. The liquid crystal cell 7 further includes a storage capacitor (not shown) in order that the charged pixel signal is stably maintained until a next pixel signal is charged. The storage capacitor is formed between the pixel electrode and the gate line of a preceding stage.

Such a liquid crystal cell 7 changes an arrangement of liquid crystals having dielectric anisotropy according to the pixel signal charged through the thin film transistor TFT to adjust light transmission, thereby implementing gray scale.

The timing controller 8 controls the gate driver 6 and the data driver 4. Each of the gate driver 6 and the data driver 4 drives the gate lines GL1 to GLn and the data lines DL1 to DLm.

At this time, the data driver 4 supplies the pixel signals by one line to the data lines DL1 to DLm per a horizontal period. To this end, the data driver 4 includes a plurality of data IC chips (not shown). The data IC chips supplies the pixel signals to the data lines DL1 to DLm in response to the data control signals supplied from the timing controller 8.

Figure 2:
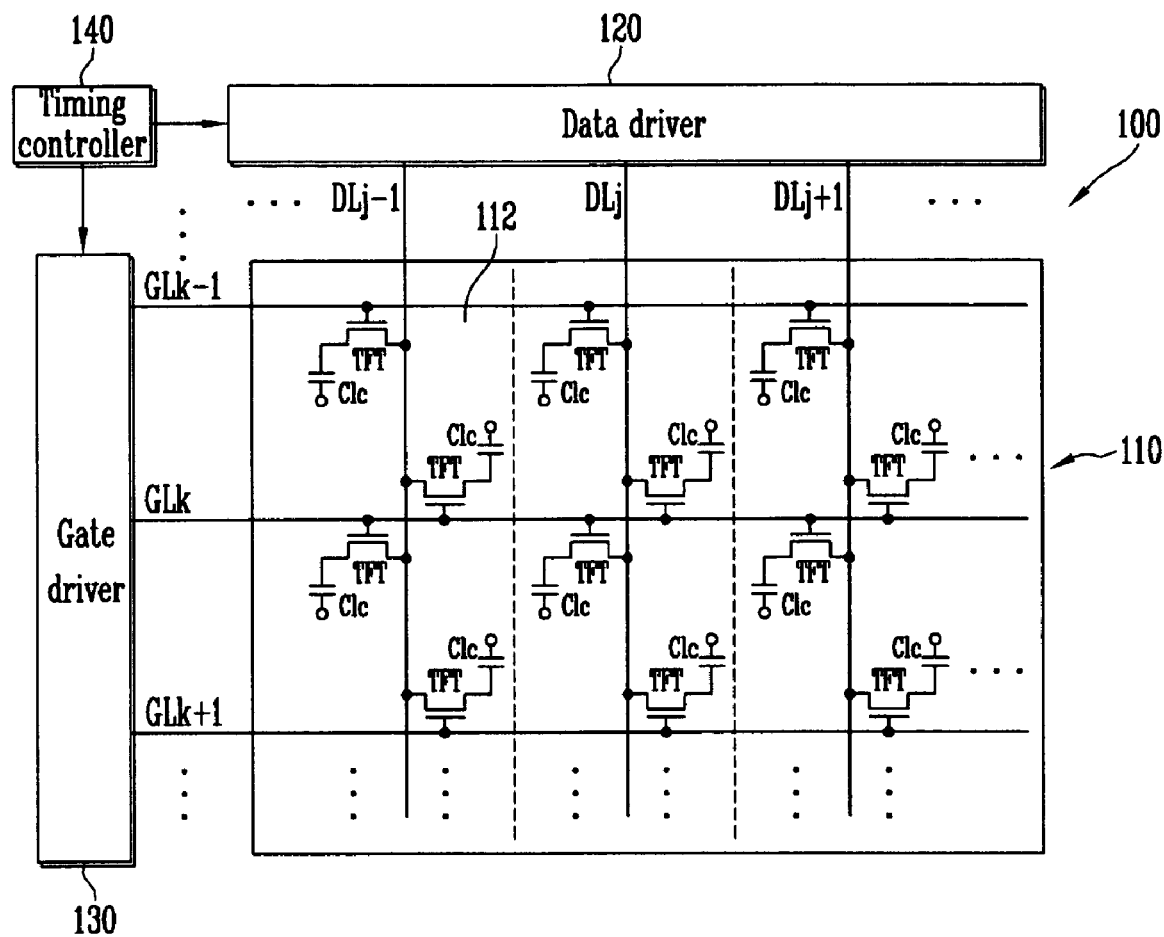
FIG. 2 is a block diagram of a liquid crystal display device according to an embodiment of the present invention.
Figure 3:
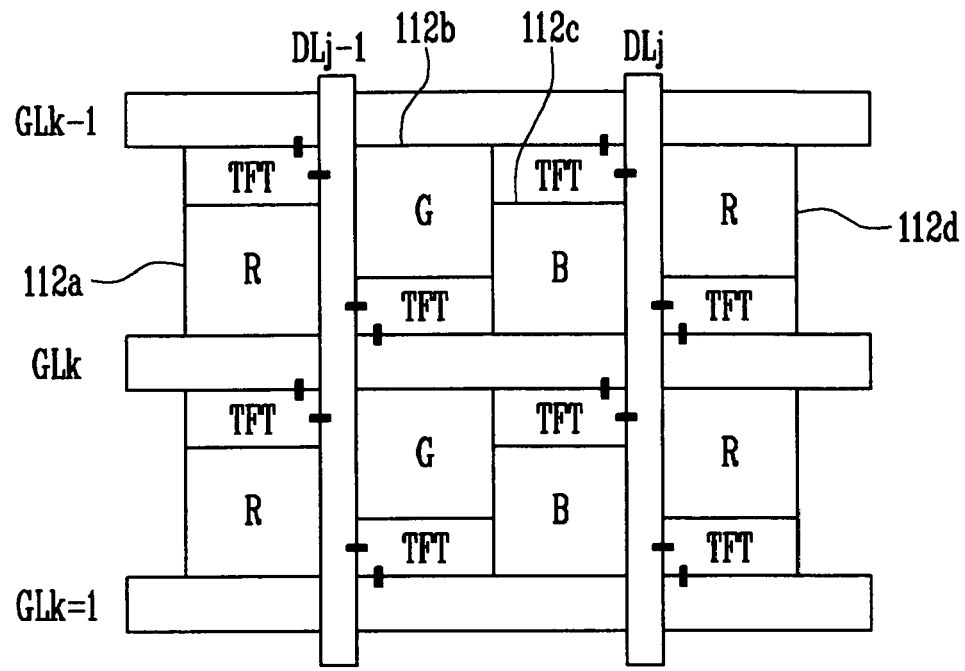
FIG. 3 is a schematic plain view of a portion of a first substrate of a liquid crystal panel shown in FIG. 2.

FIG. 2 is a block diagram of a liquid crystal display device constructed as an embodiment of the present invention, and FIG. 3 is a schematic plain view of a region of a first substrate of a liquid crystal panel shown in FIG. 2.

Referring to FIG. 2, the liquid crystal display device 100 of an embodiment of the present invention includes a liquid crystal panel 110 having pixels 112 arranged in a matrix form, a gate driver 130 for driving gate lines GL of the liquid crystal panel 110, a data driver 120 for driving data lines DL of the liquid crystal panel 110, and a timing controller 140 for controlling the gate driver 130 and the data driver 140.

The liquid crystal panel 110 includes a thin film transistor TFT formed at each of intersection portions of the gate lines (or gate electrodes) GL and the data lines (or data electrodes) DL, and a liquid crystal layer, which can be represented as a capacitor Clc coupled to the thin film transistor.

In the case that a scan signal (for example, a gate high voltage VGH) is supplied to a thin film transistor TFT from a gate line GL, the thin film transistor TFT is turned on and has pixel signals supplied from the data line DL to each of the pixels 112. In the case that the scan signal is not applied from the gate line GL, the thin film transistor TFT is turned off so that the pixel signal charged in the pixels is maintained in the pixels.

The pixel can be equivalently represented by a liquid crystal capacitance capacitor Clc, and includes a common electrode, a pixel electrode coupled to the thin film transistor TFT, and a liquid crystal layer disposed between the common electrode and the pixel electrode. The common electrode and the pixel electrode face each other with liquid crystal layer disposed therebetween.

Specifically, the liquid crystal panel 110 includes a first substrate, a second substrate, and a liquid crystal layer disposed between the first and the second substrate. The first substrate (not shown) includes gate lines GL, data lines DL, thin film transistors TFT that is positioned at an intersection portion of one of the gate lines and one of the data lines, and a pixel electrode (not shown) coupled to one of the thin film transistors. The second substrate (not shown) has a common electrode that faces the first substrate. The liquid crystal layer is disposed between the first substrate and the second substrate. Herein, the second substrate is further formed with red, green and blue color filters positioned at a region corresponding to the pixel electrodes, and with a black matrix formed in a space between the color filters.

The pixel 112 further includes a storage capacitor (not shown) in order that the charged pixel signal is stably maintained until a next pixel signal is supplied.

At this time, the embodiment of the present invention is characterized in that a pair of pixels adjacent to each other in right and left sides is coupled to one data line as shown in FIG. 2. This structure of a liquid crystal panel is referred to as a dual gate scheme. Therefore, it has an advantage that the number of the data lines can be reduced by half as compared to in a non-dual gate liquid crystal panel. That is, the portion shown in dotted line in FIG. 2, between two data lines, is a region in which the data lines would have existed in a non-dual gate structure.

In detail with reference to FIG. 3, in the embodiment of the present invention, a red (R) pixel 112a and a green (G) pixel 112b are coupled to (j-1)-th data line DLj-1, and a blue (B) pixel 112c and another red (R) pixel 112d are coupled to j-th data line DLj.

At this time, each of the pixels 112a, 112b, 112c, and 112d is divided into a thin film transistor region TFT and a pixel electrode (R, G, B, and R) region.

That is, in the case of the non-dual gate liquid crystal panel, one data line is additionally formed between the green pixel 112b and the blue pixel 112c, and only one pixel, among pixels arranged along a gate line, is coupled to each of the data lines. However, in the case of the embodiment of the present invention, a pair of pixels adjacent to each other in right and left sides in respect to a column direction is coupled to one data line, thereby making it possible to reduce the number of the data lines by half, compared to the non-dual gate liquid crystal panel. For example, referring to FIG. 4, the pixel 112a disposed by one side (left side) of the data line DLj-1 is coupled to a first gate line GLk-1, while another pixel 112b disposed by an opposite side (right side) of the data line DLj-1 is coupled a second gate line GLk. Both of pixels 112a and 112b are coupled to the date line DLj-1, and both of the pixels 112a and 112b are disposed between the first gate line GLk-1 and the second gate line GLk.

However, in this case, two gate lines and one data line are involved in one pixel column unit (a pair of pixels 112a and 112b), while one gate line and two data lines are involved in the one pixel column unit (a pair of pixels 112a and 112b) in the non-dual gate liquid crystal panel.

Referring to FIG. 3, in the case that the red (R) pixel 112a and the green (G) pixel 112b are commonly coupled to the (j-1)-th data line DLj-1, the thin film transistors TFTs of the red (R) pixel 112a and the green (G) pixel 112b are coupled to different gate lines GL. That is, the thin film transistor TFT of the red (R) pixel 112a is coupled to a (k-1)-th gate line GLk-1, and the thin film transistor TFT of the green (G) pixel 112b is coupled to a k-th gate line GLk. The short bold lines in FIG. 3 represent coupling between a thin film transistor TFT and each of the gate line and data line.

Likewise, in the case that the blue (B) pixel 112c and the red (R) pixel 112d are commonly coupled to the j-th data line DLj, the thin film transistor TFT of the blue (B) pixel 112c is coupled to a (k-1)-th gate line GLk-1, and the thin film transistor TFT of the red (R) pixel 112d is coupled to a k-th gate line GLk.

That is, in the embodiment shown in FIG. 3, pixels, which are adjacent to each other and commonly coupled to one data line, are coupled to different gate lines, one of which is located above the pixels and another of which is located below the pixels.

As shown in FIG. 3, each of pixels disposed by the left side of the data line DLj-1 is coupled to a gate line located above the pixel, while each of pixels disposed by the right side of the data line DLj-1 is coupled to a gate line located below the pixel.

With such a structure, the number of the data lines is reduced by half. Accordingly, it is also possible to reduce the number of data IC chips mounted in the data driver by half as compared with the data driver of the non-dual gate liquid crystal display device. Therefore, it is possible to overcome a disadvantage in the non-dual gate liquid crystal display device.

The liquid crystal panel in the dual gate scheme as described above has an advantage that it can reduce the number of the data IC chips by half, as compared to in the non-dual gate structure. However, it also has a disadvantage that two gate lines are arranged in one pixel column unit so that aperture ratio of the panel is decreased. Such an aperture ratio decrease causes the transmission of the liquid crystal panel to be reduced by approximately 10%. Such a transmission reduction means that brightness is reduced in the liquid crystal panel. Therefore, it has a limitation in application to a portable apparatus especially requiring outdoor visibility.

In order to overcome this disadvantage in the dual gate scheme, in the present invention, a portion of the black matrix formed on an upper substrate, which corresponds to a gate line, is opened while adopting the dual gate scheme. External light is reflected from the gate line exposed through the opening of the black matrix, improving the outdoor visibility.

The characteristic of the present invention will be described in detail with reference to FIG. 4 and FIG. 5.

Figure 4:
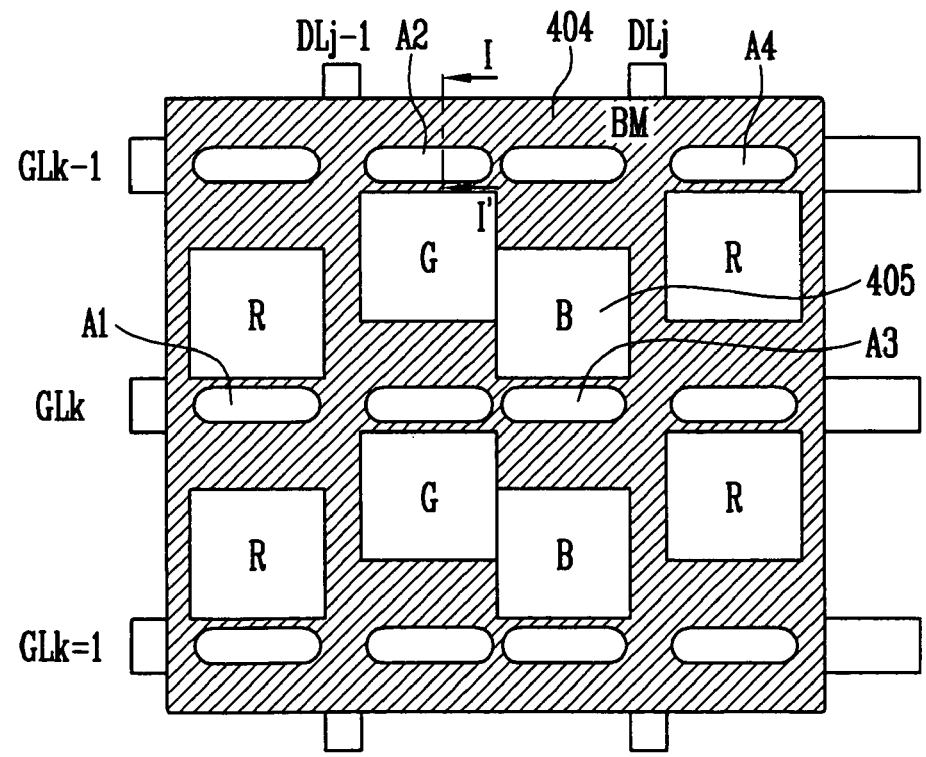
FIG. 4 is a schematic plain view of a portion of a second substrate corresponding to the portion of the first substrate of a liquid crystal panel shown in FIG. 3.

FIG. 4 is a schematic plain view of a portion of a second substrate corresponding to the portion of the first substrate of the liquid crystal panel shown in FIG. 3. FIG. 5 is a cross-sectional view of a specific region (I-I') shown in FIG. 4, which is a cross-sectional view of a gate line exposure region of the present invention.

Figure 5:
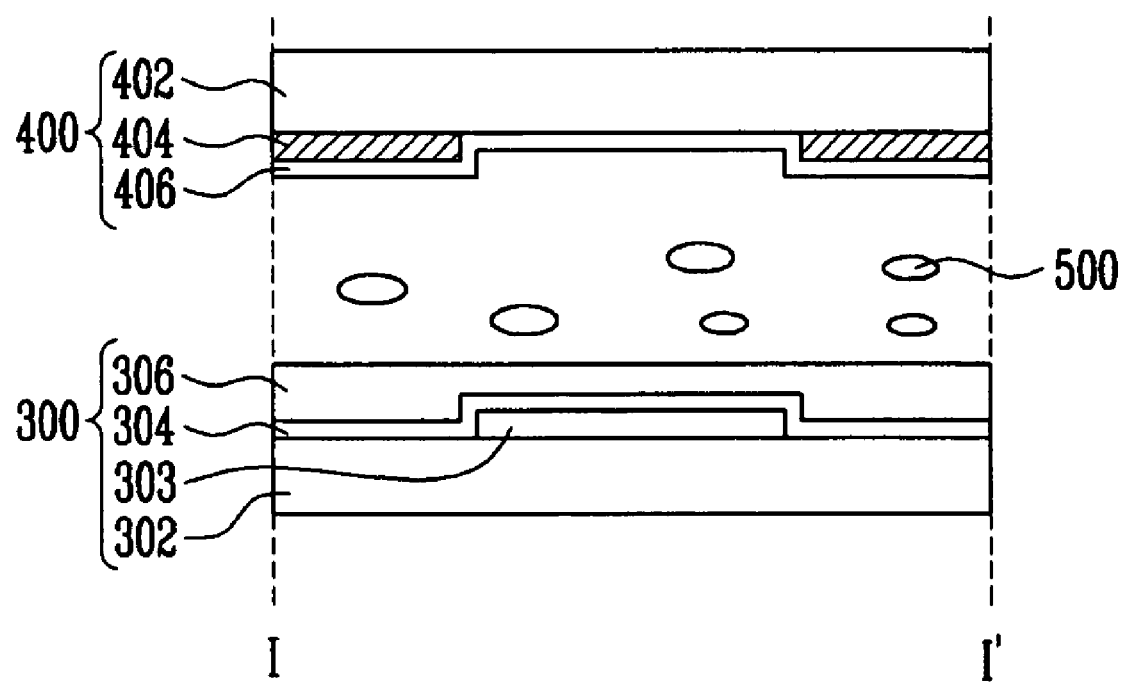
FIG. 5 is a cross-sectional view of a specific region (I-I') shown in FIG. 4.

Referring to FIGS. 4 and 5, the second substrate 400 of the liquid crystal panel of the embodiment of the present invention faces the first substrate 300, and a liquid crystal layer 500 is disposed therebetween. Such a second substrate 400 has a common electrode 406 formed thereon facing the first substrate 300, and is formed with red (R), green (G), and blue (B) color filters 405 positioned to correspond to the pixel electrode (R, G, B, and R) regions shown in FIG. 3. A black matrix 404 positioned between the color filters.

In order to overcome the disadvantage in the dual gate scheme as described above, the embodiment of the present invention is characterized in that portions of the black matrix 404, formed on the upper substrate corresponding to the gate line, is opened. In other words, the black matrix 404 has openings, for example openings A1 through A4, thereby exposing a portion of the gate line formed on the first substrate 300. The portion of the gate line (gate electrode) is exposed through the opening of the black matrix 404.

At this time, a gate insulating film 304 and a passivation layer 306 formed on the gate line 303 are formed of a transparent material. Reference numerals 302 and 402 refer to transparent substrates.

In the present invention, if external light transmits to portions of the gate line 303 exposed through openings A1 through A4 of the black matrix, the external light is reflected from the gate electrode. Therefore, it is possible to overcome the aperture ratio decrease caused by the liquid crystal display device in the dual gate scheme, and to increase the outdoor visibility, while maintaining the advantage of the liquid crystal display device in the dual gate scheme. That is, cost reduction by means of the reduction in the number of the data IC chips can be achieved.

At this time, the opening portion in the black matrix 404 is a region corresponding to the gate line 303 not intersecting with the data lines. In one embodiment as shown in FIG. 4, openings are formed along the gate lines at locations between two data lines. Each of the color filters is arranged between two of the openings, one of which is formed above the color filter and another of which is formed below the color filter. The two openings aligned in a direction parallel to a data line.

Figure 6:
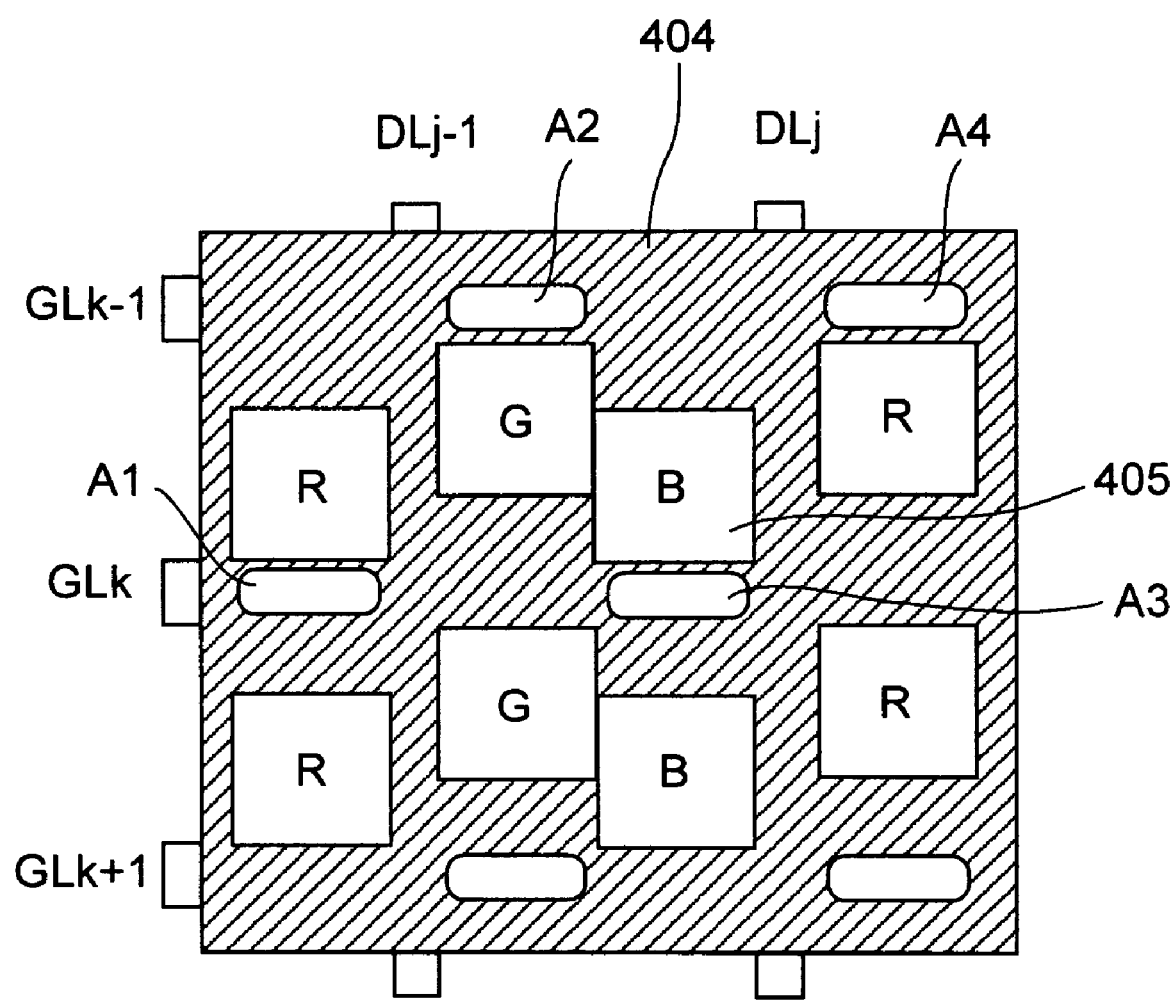
FIG. 6 is a schematic plain view of a portion of a second substrate constructed as another embodiment.

FIG. 6 is a schematic plain view of a portion of a second substrate constructed as another embodiment. Some of the openings shown in FIG. 4 are removed, and the openings shown in FIG. 6 are arranged in a check pattern crossing each other pixel.

Again, referring to FIGS. 3 and 6, in the case of the red (R) pixel 112a and the green (G) pixel 112b commonly coupled to the (j-1)-th data line DLj-1 for an example, the thin film transistor TFT of the red pixel 112a is coupled to the (k-1)-th gate line GLk-1, and the thin film transistor TFT of the green pixel 112b is coupled to the k-th gate line GLk.

Therefore, since the k-th gate line GLk is not coupled to the thin film transistor TFT of the pixel 112a, an opening A1 of the black matrix of the second substrate corresponding to the k-th gate line is formed, as shown in FIG. 6. Accordingly, the k-th gate line in the red pixel region 112a is exposed.

Likewise, since the (k-1)-th gate line GLk-1 of the green pixel 112b is not coupled to the thin film transistor TFT of the pixel 112b, an opening A2 of the black matrix of the second substrate corresponding to the (k-1)-th gate line is formed, as shown in FIG. 6. Accordingly, the (k-1)-th gate line in the red pixel region 112b is exposed.

That is, each of the pixels arranged in one pixel column is alternately coupled to the gate lines adjacent to each other up and down, as shown in FIG. 3. Accordingly, each of the openings A1, A2, A3, and A4 of the black matrix formed on the second substrate is also alternatively formed, as shown in FIG. 6. In this case as shown in FIG. 6, two color filters in a pixel column are disposed between two nearest openings. The present invention, however, can have more than two color filters in a pixel column disposed between two nearest openings.

At this time, the gate lines to which each of the pixels 112a, 112b, 112c, and 112d is coupled are different by a pixel from the gate lines exposed by means of the openings A1, A2, A3, and A3 of the black matrix.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A liquid crystal display device comprising:
a first substrate comprising:
a plurality of data electrodes;
a plurality of gate electrodes arranged to intersect the data electrodes; and
a plurality of pixels, each of the pixels including a thin film transistor and a pixel electrode, each of the pixels coupled to one of the data lines and one of the gate lines;
a second substrate facing the first substrate, the second substrate comprising:
a plurality of color filters, each of the color filters facing one of the pixel electrodes; and
a black matrix formed on a region in which the color filters are not formed, the black matrix having openings that expose the gate electrodes; and
a liquid crystal layer disposed between the first substrate and the second substrate,
wherein the openings alternate on opposite sides of the color filters with no openings adjacent to each other.

2. The liquid crystal display device as claimed in claim 1, wherein one of the pixels disposed by one side of a first one of the data electrodes is coupled to a first one of the gate electrodes, and another of the pixels disposed by an opposite side of the first one of the data electrodes is coupled to a second one of the gate electrodes.

3. The liquid crystal display device as claimed in claim 2, wherein both of the one of the pixels and the another of the pixels are coupled to the first one of the data electrodes.

4. The liquid crystal display device as claimed in claim 2, wherein both of the one of the pixels and the another of the pixels are disposed between the first one of the gate electrodes and the second one of the gate electrodes.

5. The liquid crystal display device as claimed in claim 4, wherein:
one of the openings is formed on the second one of the gate electrodes, the one of the openings being formed between the first one of the data electrodes and a second one of the data electrodes located by the one side of the first one of the data electrodes; and
another of the openings is formed on the first one of the gate electrodes, the another of the openings being formed between the first one of the data electrodes and a third one of the data electrodes located by the opposite side of the first one of the data electrodes.

6. The liquid crystal display device as claimed in claim 5, wherein:
no opening is formed on a portion of the first one of the gate electrodes located between the first one of the data electrodes and the second one of the data electrodes; and
no opening is formed on a portion of the second one of the gate electrodes located between the first one of the data electrodes and the third one of the data electrodes.

7. The liquid crystal display device as claimed in claim 1, wherein one of the pixels disposed by one side of one of the data electrodes and another of the pixels disposed by an opposite side of the one of the data electrodes are both coupled to the one of the data electrodes.

8. The liquid crystal display device as claimed in claim 7, wherein the one of the pixels and the another of the pixels are coupled to different ones of the gate electrodes.

9. The liquid crystal display device as claimed in claim 8, wherein the one of the pixels and the another of the pixels are both disposed between the different ones of the gate electrodes.

10. The liquid crystal display device as claimed in claim 1, wherein each of the openings exposes a portion of one of the gate electrodes located between two of the data electrodes.

11. The liquid crystal display device as claimed in claim 1, wherein each of the color filters is arranged between two of the openings.

12. The liquid crystal display device as claimed in claim 11, wherein the two of the openings are aligned in a direction substantially parallel to one of the data electrodes.

13. The liquid crystal display device as claimed in claim 1, wherein at least two of the color filters are arranged between nearest two of the openings.

14. The liquid crystal display device as claimed in claim 13, wherein the nearest two of the openings are aligned in a direction substantially parallel to one of the data electrodes.

15. The liquid crystal display device as claimed in claim 1, wherein at least two of the pixels are disposed between two of the data electrodes.

16. The liquid crystal display device as claimed in claim 15, wherein one of the at least two of the pixels is coupled to a first one of the gate electrodes, and another of the at least two of the pixels is coupled to a second one of the gate electrodes.

17. The liquid crystal display device as claimed in claim 15, wherein the one of the at least two of the pixels and the another of the at least two of the pixels are both formed between the first one of the gate electrodes and the second one of the gate electrodes.

18. The liquid crystal display device as claimed in claim 15, wherein:
one of the openings is formed on the second one of the gate electrodes at a location closer to the one of the at least two of the pixels than the another of the at least two of the pixels; and
another of the openings is formed on the first one of the gate electrodes at a location closer to the another of the at least two of the pixels than the one of the at least two of the pixels.

* * * * *